(12) United States Patent
Giese et al.

(10) Patent No.: US 12,090,827 B2
(45) Date of Patent: Sep. 17, 2024

(54) SUNSHADE ASSEMBLY

(71) Applicant: Inalfa Roof Systems Group B.V., Oostrum (NL)

(72) Inventors: Christian Giese, Goch (DE); Sofiane Zaïn, Goch (DE)

(73) Assignee: INALFA ROOF SYSTEMS GROUP B.V., Oostrum (NL)

( * ) Notice: Subject to any disclaimer, the term of this patent is extended or adjusted under 35 U.S.C. 154(b) by 0 days.

(21) Appl. No.: 17/214,046

(22) Filed: Mar. 26, 2021

(65) Prior Publication Data
US 2021/0300163 A1    Sep. 30, 2021

(30) Foreign Application Priority Data

Mar. 30, 2020 (EP) ..................... 20166738

(51) Int. Cl.
*B60J 7/00*    (2006.01)
*B60J 7/06*    (2006.01)

(52) U.S. Cl.
CPC ............. *B60J 7/0015* (2013.01); *B60J 7/067* (2013.01)

(58) Field of Classification Search
CPC ........ B60J 7/0015; B60J 7/067; B60J 1/2052; B60J 7/0007; B60J 7/0023
(Continued)

(56) References Cited

U.S. PATENT DOCUMENTS 4,650,243 A    3/1987 Hanley et al.
4,679,846 A    7/1987 Lux et al.
(Continued)

FOREIGN PATENT DOCUMENTS

DE    3802380 A    8/1988
DE    9302762 U1    4/1993
(Continued)

OTHER PUBLICATIONS

Lipovsky et al., "Roller blind arrangement for e.g. installation at roof of motor vehicle, has synchronous wheel connected between draw loops, and drive cable engaged at synchronous wheel", Mar. 11, 2010, German Patent Office, Edition: DE-102008046333-A1 (Year: 2010).*

(Continued)

*Primary Examiner* — Amy R Weisberg
*Assistant Examiner* — Veronica M Shull
(74) *Attorney, Agent, or Firm* — Steven M. Koehler; Westman, Champlin & Koehler, P.A.

(57) ABSTRACT

A sunshade assembly comprises a first and second movable sunshades and a drive assembly. The drive assembly comprises a first slider coupled to a first drive member through a first coupling and connected to the first sunshade, and a second slider attached to a second drive member and connected to the second sunshade. The first coupling can be uncoupled to drive the second slider while not driving the first slider. The first coupling includes a coupling member to couple and uncouple the coupling member from a counter member on the first slider by a movement of the coupling member. The coupling member of the first drive member arrives in a guide when the coupling member must be uncoupled from the counter member and is shaped to cause the movement of the coupling member when the first and second drive members move further to open or close the second sunshade.

20 Claims, 9 Drawing Sheets

(58) Field of Classification Search
USPC .................. 296/214, 216.01, 216.08, 219
See application file for complete search history.

(56) References Cited

U.S. PATENT DOCUMENTS

| | | | |
|---|---|---|---|
| 4,699,421 A | 10/1987 | Schaetzler et al. | |
| 4,741,573 A | 5/1988 | Yokota | |
| 4,923,246 A | 5/1990 | Takahashi et al. | |
| 4,978,165 A | 12/1990 | Schreiter et al. | |
| 4,995,665 A | 2/1991 | Ichinose et al. | |
| 5,026,113 A | 6/1991 | DiCarlo et al. | |
| 5,447,355 A | 9/1995 | Kelm | |
| 5,464,267 A | 11/1995 | Racine et al. | |
| 5,632,523 A | 5/1997 | Kelm | |
| 5,707,102 A | 1/1998 | Takahashi et al. | |
| 6,416,122 B1 | 7/2002 | Schwarz et al. | |
| 6,443,520 B1 | 9/2002 | Schmaelzle | |
| 6,652,022 B2 | 11/2003 | Pfalzgraf et al. | |
| 6,805,402 B2 | 10/2004 | Pfalzgraf | |
| 6,848,493 B1* | 2/2005 | Hansen | B60J 1/2044 |
| | | | 160/265 |
| 7,178,862 B2 | 2/2007 | Oechel | |
| 7,182,400 B2 | 2/2007 | Grimm et al. | |
| 7,828,376 B2 | 11/2010 | Nellen | |
| 7,850,230 B2 | 12/2010 | Faerber | |
| 7,878,581 B2 | 2/2011 | Faerber et al. | |
| 8,579,005 B2* | 11/2013 | Lee | B60J 7/0015 |
| | | | 160/370.22 |
| 8,678,488 B1* | 3/2014 | Kim | B60J 7/0015 |
| | | | 296/214 |
| 8,807,639 B2 | 8/2014 | Sawada | |
| 8,857,903 B2 | 10/2014 | Nellen et al. | |
| 9,227,486 B2* | 1/2016 | Dietl | B60J 7/0015 |
| 9,840,134 B2* | 12/2017 | Van Boxtel | B60J 7/0015 |
| 9,845,002 B2 | 12/2017 | Nellen | |
| 10,647,188 B2 | 5/2020 | van de Westerlo | |
| 2002/0145310 A1 | 10/2002 | Schatzler et al. | |
| 2002/0163227 A1 | 11/2002 | Pfalzgraf et al. | |
| 2005/0200165 A1 | 9/2005 | Grimm et al. | |
| 2005/0231007 A1 | 10/2005 | Dechel | |
| 2007/0114817 A1 | 5/2007 | Becher et al. | |
| 2007/0221339 A1 | 9/2007 | Elbs et al. | |
| 2008/0083518 A1* | 4/2008 | Sadornil Santamaria | B60J 7/0015 |
| | | | 160/370.21 |
| 2009/0179462 A1 | 7/2009 | Nellen | |
| 2010/0164253 A1 | 7/2010 | Faerber et al. | |
| 2013/0307296 A1 | 11/2013 | Sawada | |
| 2015/0130227 A1 | 5/2015 | Dietl | |
| 2017/0008383 A1* | 1/2017 | Ten-Jet-Foei | B60J 7/0015 |
| 2017/0043650 A1 | 2/2017 | Nellen | |
| 2019/0176603 A1 | 6/2019 | van de Westerlo | |
| 2020/0282814 A1* | 9/2020 | Alban | B60J 1/2025 |

FOREIGN PATENT DOCUMENTS

| | | | | |
|---|---|---|---|---|
| DE | 19713347 C1 | 5/1999 | | |
| DE | 10345855 A1 | 5/2005 | | |
| DE | 10348545 A1 | 5/2005 | | |
| DE | 20319522 U1 | 5/2005 | | |
| DE | 102004012525 A1 | 10/2005 | | |
| DE | 102004018461 A1 | 11/2005 | | |
| DE | 102005007031 A1 | 8/2006 | | |
| DE | 102008046333 A1 * | 3/2010 | | B60J 7/0015 |
| DE | 102013009083 A1 | 12/2014 | | |
| DE | 202014103089 U1 | 10/2015 | | |
| DE | 102015011639 A1 | 3/2017 | | |
| DE | 102017122496 A1 | 3/2019 | | |
| DE | 102018007923 A1 | 9/2019 | | |
| EP | 0381066 A2 | 8/1990 | | |
| EP | 1741588 A1 | 1/2007 | | |
| EP | 1790515 A1 | 5/2007 | | |
| EP | 2078630 A1 | 7/2009 | | |
| EP | 3130495 A1 | 2/2017 | | |
| FR | 2726512 A1 | 5/1996 | | |
| JP | H10129268 A2 | 5/1988 | | |
| JP | 2012091575 A | 5/2012 | | |
| NL | 1014023 C2 | 7/2001 | | |
| WO | WO-2005102803 A1 * | 11/2005 | | B60J 7/0015 |
| WO | 2006086955 A1 | 8/2006 | | |
| WO | 2007079747 A1 | 7/2007 | | |

OTHER PUBLICATIONS

European Search Report for corresponding European Patent Application No. 20166738.3 dated Sep. 30, 2020.

\* cited by examiner

SUNSHADE ASSEMBLY

BACKGROUND

The discussion below is merely provided for general background information and is not intended to be used as an aid in determining the scope of the claimed subject matter.

Aspects of the invention relate to a sunshade assembly for a vehicle having a first and second moveably arranged sunshades positioned one behind the other and operated by a drive.

A roof assembly having such drive and guide system is known from JP H10129268 A2. One drive cable is operating a front and a rear mechanism which require a different travel length of operation per mechanism. The drive cable operates through a pin/curve in association with a locking lever which locks or unlocks the front mechanism while still moving the rear mechanism.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A sunshade assembly for a vehicle having at least one roof opening in a fixed roof comprises at least a first and second moveably arranged sunshades positioned one behind the other and each provided for covering a passage opening below the at least one roof opening and a drive assembly for moving the sunshades. The drive assembly comprises:
- a first guide defining a first slider track extending between a first track end and a second track end;
- an elongated first drive member operatively guided by a guide channel of the first guide,
- a first slider arranged to be coupled to the first drive member through a first coupling and connected to the first sunshade;
- a second guide defining a second slider track extending between a first track end and a second track end, the first guide being substantially aligned with the second guide,
- an elongated second drive member operatively guided by a guide channel in the second guide,
- a second slider attached to the second drive member and connected to the second sunshade,
- a drive motor operatively coupled to the first drive member and configured to move the first slider along the first slider track between the first track end and the second track end and guided by the guide channel of the first guide in order to move the first sunshade, and operatively coupled to the second drive member and configured to the second slider along the second slider track between the first track end and the second track end of the second slider track and guided by the guide channel of the second guide in order to move the second sunshade,
- a connecting guide connecting the first and second guides to guide at least one of the first and elongated second drive members between the first and second guides.

The second slider track is longer than the first slider track. The first coupling between the elongated first drive member and the first slider can be uncoupled to drive the second slider while not driving the first slider, and wherein the first coupling includes a coupling member connected to the first drive member to couple and uncouple the coupling member from a counter member on the first slider by a movement of the coupling member. The connecting guide is shaped to cause the movement of the coupling member when the drive members move in order to open or close the first and second sunshades.

Because the connecting guide itself is shaped to cause the coupling member to move, the structure can be relatively simple without various movable parts.

Preferably the coupling member is rotatable around an axis substantially parallel to the first slider track, and in that the connecting guide is shaped to cause the rotation of the coupling member.

Such rotation is relatively easy to accomplish in a reliable manner.

In one embodiment, the coupling member is fixed to the elongated first drive member which is able to be twisted around its longitudinal axis.

Such twisting is for example possible with well-known push-and-pull cables as elongated drive member, and in that case the cable itself ensures a return force which may make control even more reliable in two directions.

The connecting guide may comprise a longitudinal guide duct to guide the elongated first drive member, the guide duct being open through a control slit to allow the coupling member to extend between the first drive member and the counter member, the slit being curved along the length of the guide duct to cause the rotation of the coupling member.

This causes an easy control of the rotation of the coupling member without the need of any moving element.

The coupling member and the counter member may include fitting protrusions/recesses locking the coupling member and counter member in longitudinal direction.

Such protrusions and recesses may easily be brought into and out of engagement with each other.

In an embodiment, the connecting guide is injection molded and made in at least two parts which together define the guide duct and the control slit for the coupling member.

If the connecting guide is made up of at least two injection molded parts there is a great freedom in design of the control slit.

The parts of the connecting guide may be provided with positioning and fixing members to fit and fix the two parts in the correct position.

Preferably, the connecting guide is provided with end portions fitting into end portions of the first and second guides.

This manner of attachment may on the one hand ensure a smooth transition for the drive member and on the other hand ensures correct attachment of the connecting guide with respect to the first and second guides.

In one embodiment, the sunshades are arranged to move in opposite directions, and thus the first drive member and the second drive member are arranged to move with equal speed in opposite directions.

In this embodiment, the first and second drive members may be separate elements arranged parallel to each other and moving in opposite directions.

When the sunshades are arranged to move in equal directions, and thus the first drive member and the second drive member are arranged to move with equal speed in the same direction, the first and second drive members are preferably arranged in series and may form two portions of a single element.

In another aspect of the invention, the second end of the first guide is provided with a drive member guide into which the coupling member of the first drive member arrives when the coupling member must be uncoupled from the counter member and which is shaped to cause the movement of the coupling member when the first and second drive members move further to open or close the second sunshade member.

This enables all kinds of different arrangements of the sunshades. Sunshades are preferably rollo sunshades but may also comprises sliding sunshade panels or other moving sunshades.

An aspect of the invention also includes a roof assembly for a vehicle having a roof opening in its fixed roof, comprising at least one closure member for closing and at least partly opening the roof opening and further comprising the sunshade assembly as described above.

Further scope of applicability of aspects of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description.

DETAILED DESCRIPTION OF THE ILLUSTRATIVE EMBODIMENTS

Aspects of the present invention will now be described with reference to the accompanying drawings, wherein the same reference numerals have been used to identify the same or similar elements throughout the several views.

Figure 1:
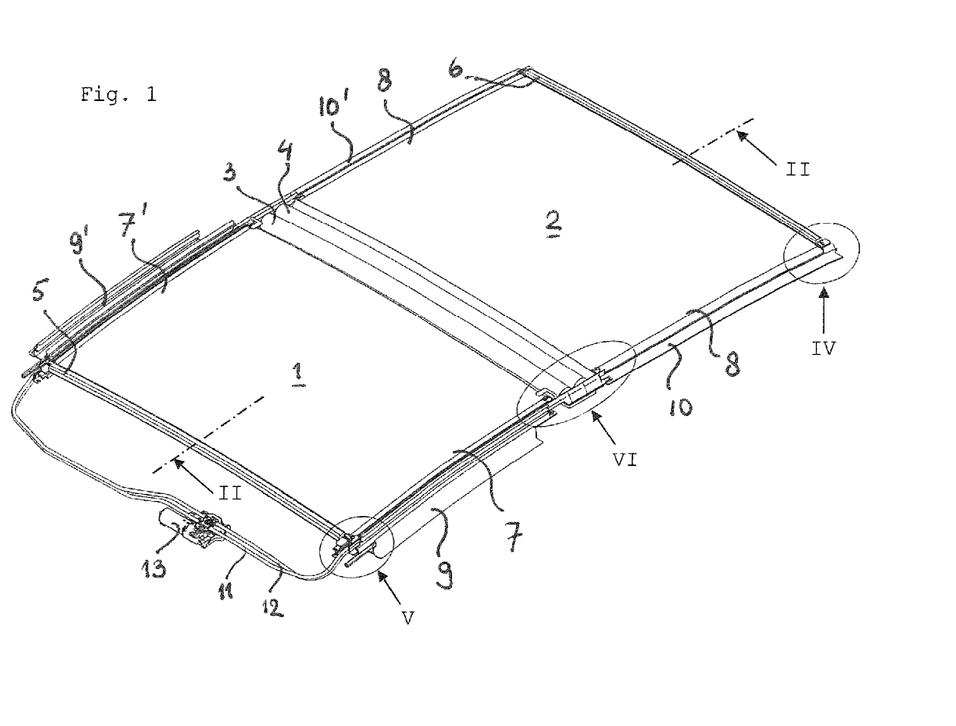
FIG. 1 is a perspective view of a sunshade assembly.

The sunshade assembly as shown in FIG. 1 is intended for use in a roof assembly provided in one or more roof openings of a vehicle roof. The roof assembly may comprise a moveable panel and a fixed panel. The moveable panel is also referred to as a closure member, since the moveable panel is moveable over a first roof opening such to enable to open and to close a first roof opening.

The moveable panel can be moved to a closed position, which is a position wherein the moveable panel is arranged over/within and closes the first roof opening and thus usually is arranged in a plane of the vehicle roof. Further, the moveable panel may for example be moved to a tilted position, which is a position wherein a rear end of the moveable panel is raised as compared to the closed position, while a front end of the moveable panel is still substantially in the closed position. Further, the moveable panel may be moved to an open position, which is a position wherein the moveable panel is slid open (mostly in rearward direction) and the first roof opening is partly or completely exposed. Other movements are conceivable.

It is noted that the vehicle for which the roof assembly is intended is a passenger car. The present invention is however not limited to passenger cars. Any other kind of vehicles, such as trucks, mobile homes or caravans that may be provided with a roof assembly and sunshade assembly are contemplated as well.

The roof assembly includes a second roof opening which may be closed by a fixed panel such that light may enter a vehicle interior space through the fixed panel, presuming that the fixed panel is a glass panel or a similarly (semi) transparent panel, for example made of a plastic material or any other suitable material. It is noted that the second roof opening may be integral with the first roof opening. A roof assembly as described above may for example be like that as disclosed in US 2019/0176603 A1, the contents of which are incorporated herein by reference thereto.

Figure 2:
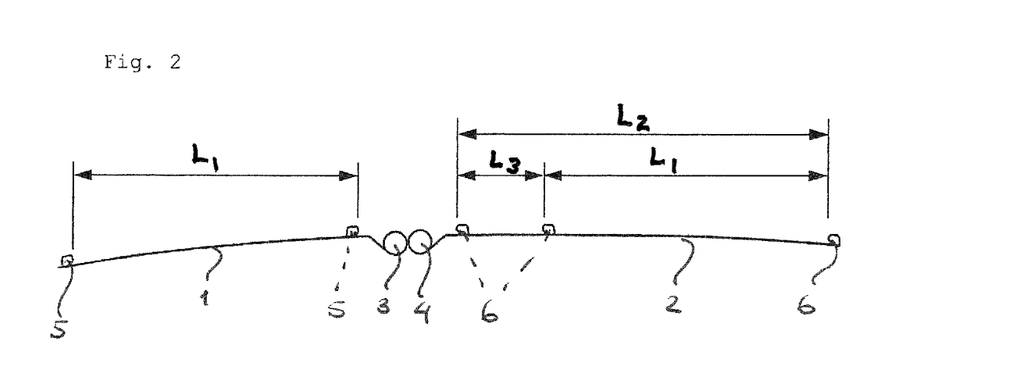
FIG. 2 is a very schematic sectional view of the rollo configuration of FIG. 1 according to the line II-II therein.

FIGS. 1 and 2 show a first embodiment of the sunshade assembly including a first or front rollo sunshade 1 to block light coming through the first roof opening and a second rollo sunshade 2 to block light coming through the second roof opening. Generally a frame of the roof assembly forms a first passage opening below the first roof opening and a second passage opening below the second roof opening, which first and second passage opening are selectively opened and closed by the first and second sunshades 1, 2.

The sunshades 1, 2 are normally made from cloth material and have an end edge attached to a winding roller 3, 4, respectively, an opposite end edge attached to an operating beam 5, 6, respectively, and opposite side edges 7, 7' and 8, 8'. In this embodiment winding rollers 3, 4 are arranged back to back so that the rollo sunshades move in opposite direction when they make a winding (opening) or unwinding (closing) movement. Other arrangements are conceivable.

Figures 8A, 8B, 8C, 9:
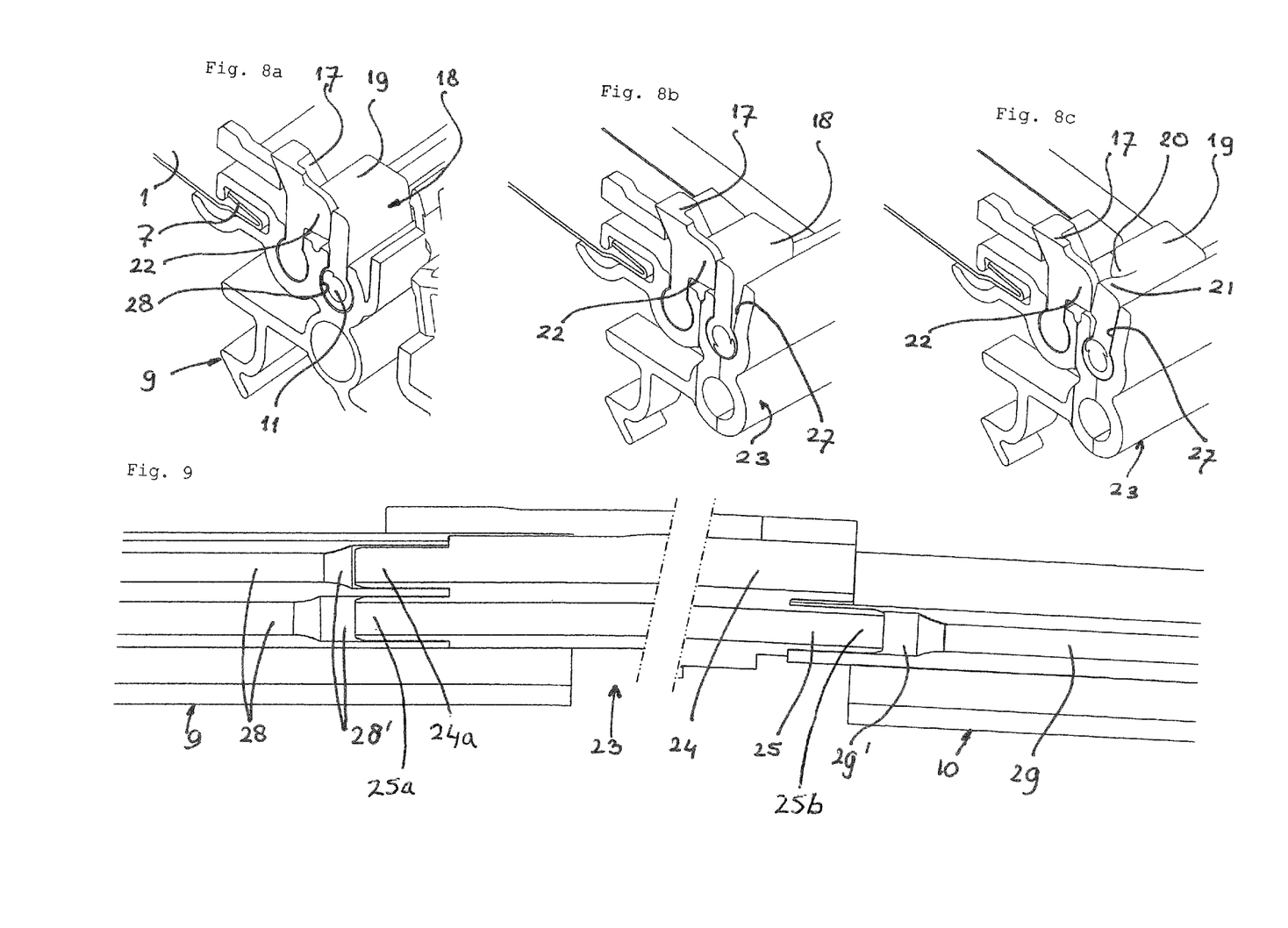
FIGS. 8a, 8b and 8c are sectional views according to the lines VIIIa-VIIIa, VIIIb-VIIIb and VIIIc-VIIIc in FIGS. 3a, 7a and 7b, respectively, on a larger scale.
FIG. 9 is a sectional view according to the line IX-IX in FIG. 3a on a larger scale.

FIG. 1 further illustrates a drive assembly for the sunshades having a first guide 9, 9', a second guide 10, 10', a first drive cable 11 and a second drive cable 12, in this embodiment forming the elongated first and second drive members 11, 12. The first and second guides 9, 9' and 10, 10' are arranged to guide the respective side edges 7, 7' and 8, 8' respectively on opposite side edges of sunshades 1, 2 in a well-known manner, for example as is shown in FIG. 8. The guides 9, 9', 10, 10' are generally coupled to a frame or other stationary part (not shown) below opposite side edges of the roof opening (s). The first and the second drive cables 11, 12 are provided to move opposite ends of operating beams 5, 6, respectively, and are driven by a drive motor 13. First guides 9, 9' will normally also be used for guiding an operating mechanism for the movable panel. This is not shown and does not form part of the present invention.

As mentioned, the drive cables 11, 12 couple the drive motor 13 to the operating beams 5, 6. One end of drive cable 11 can be coupled to operating beam 5 of sunshade 1 in front guide 9, the other end—which moves in opposite direction on the other side of sunshades 1, 2—is coupled to operating beam 6 of sunshade 2 in second guide 10'. One end of drive cable 12 is coupled to operating beam 6 of sunshade 2 in rear guide 10, while the opposite end—which moves in opposite direction on the other side of sunshades 1, 2—can be coupled to operating beam 5 of front sunshade 1 in front guide 9'. The drive cables 11, 12 are normally push-and-pull cables well known in the art and are therefore not further elucidated herein.

FIG. 2 shows that operating beam 5 of sunshade 1 is able to travel a length $L_1$ and operating beam 6 has a maximum travel length of $L_2$ which is a length $L_3$ longer than length $L_1$. This means that if both sunshades 1 and 2 are moved from the completely open (wound) to the completely closed (unwound) position, both sunshades 1, 2 are simultaneously moved through a length $L_2$, after which sunshade 1 should be stopped, while sunshade 2 is moved further through a length $L_3$. The invention provides a solution to interrupt driving one of the sunshades in a simple and effective manner.

Figures 3A, 3B:
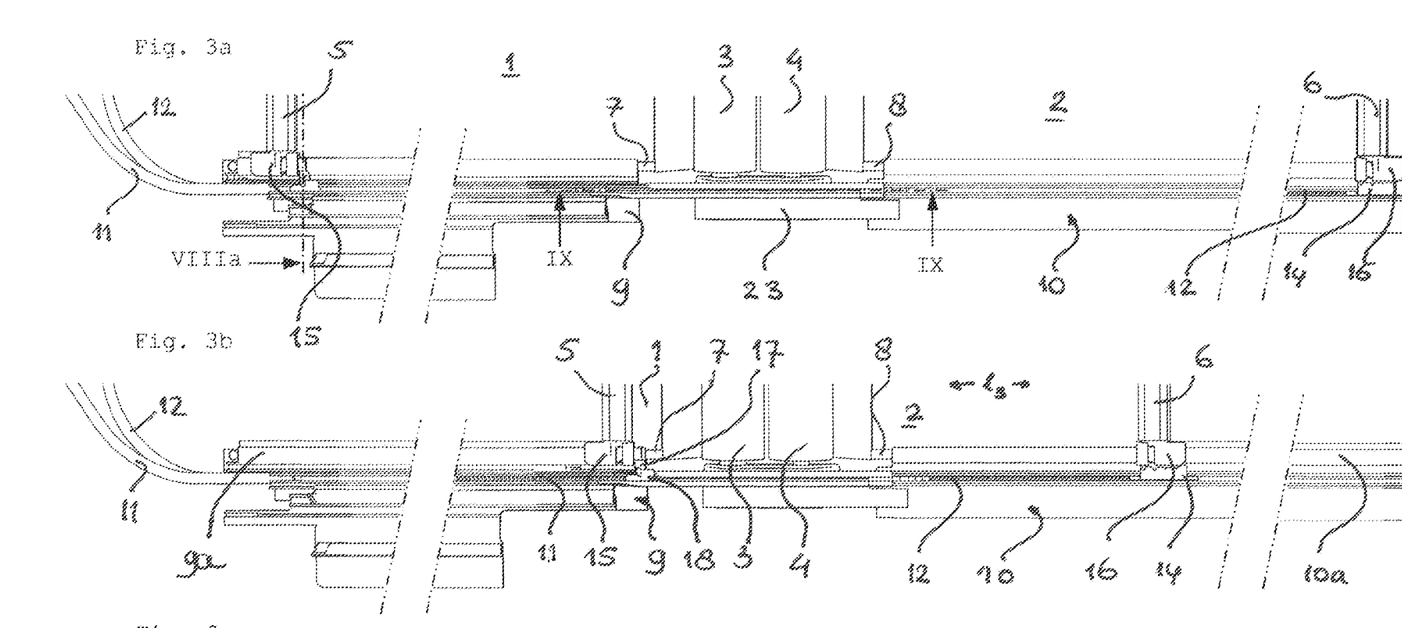
FIGS. 3a, 3b and 3c are plan views of the drive system of the rollo assembly of FIG. 1 in 3 different positions.
Figure 3C:
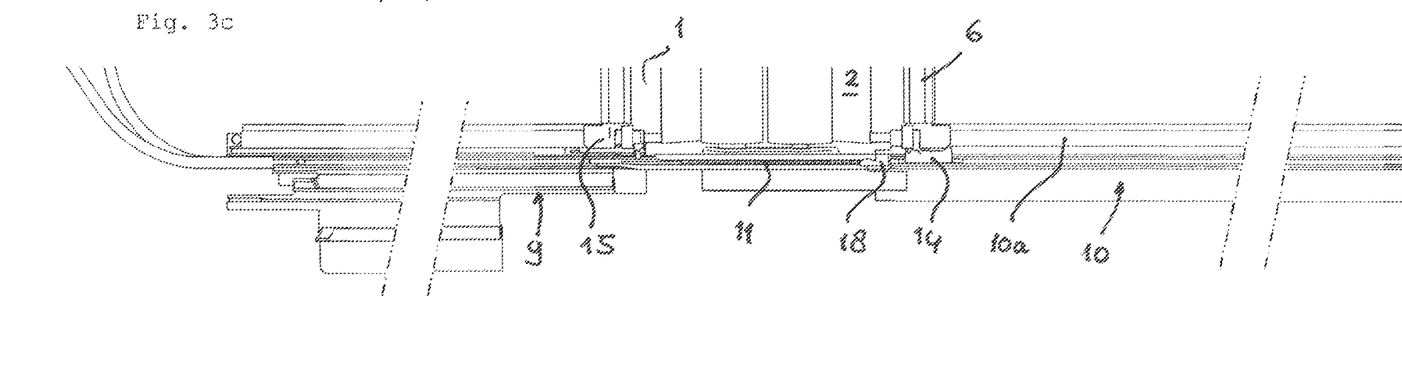

FIGS. 3a-3c show one side edge 7, 8 of the sunshades 1, 2 and their guide and drive means. The same parts are generally present at the other side edge, albeit in mirror image, only cables 11, 12 are switched as explained above. FIG. 3a shows both sunshades 1, 2 in their closed (unwound) position (a part of the sunshades 1, 2 is cut away). In FIG. 3b, the front sunshade 1 has arrived in its fully open (wound) position, while rear sunshade 2 is still a length $L_3$ away from its open position. Cable 11 is then uncoupled from operating beam 5 of front sunshade 1, while rear sunshade 2 is continuously coupled to cable 12 and is thus driven further to the position of FIG. 3c in which both sunshades 1, 2 are open.

Figure 4A:
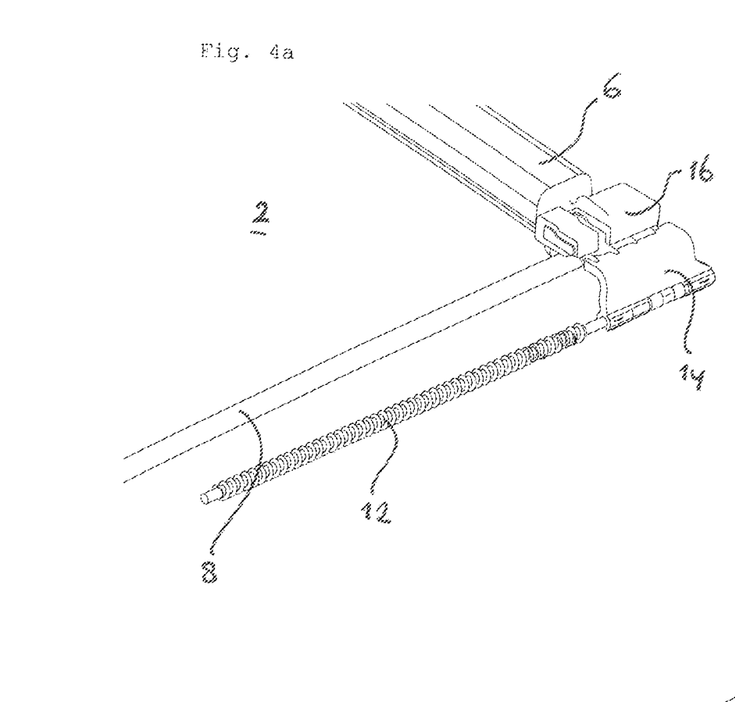
FIGS. 4a and 4b are a perspective view and an exploded view, respectively, of detail IV in FIG. 1.
Figure 4B:
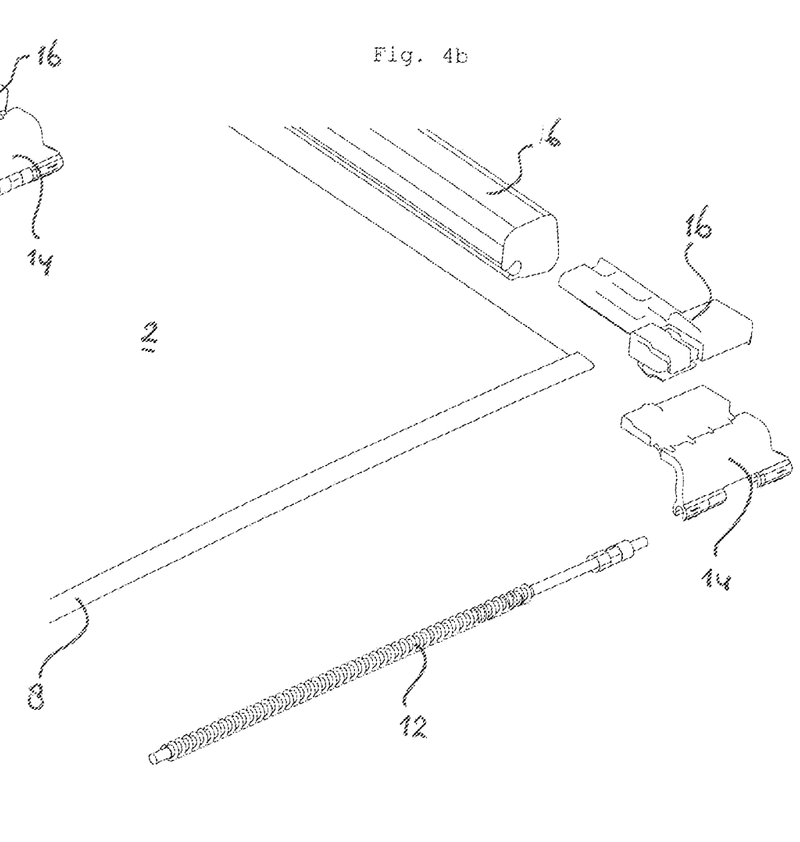

FIG. 4a, 4b show the fixed coupling between cable 12 and operating beam 6 of sunshade 2. As is shown, a coupling member 14 is clipped to cable 12, such that it is locked against sliding with respect to cable 12, but able to rotate around the longitudinal axes of cable 12 if necessary. Coupling member 14 is fitted into a slider 16 of operating beam 6 such that no movement between them is possible. FIGS. 3a-3c show that slider 16 of operating beam 6 is guided by a slider track 10a of second guide 10 between a first and second track end.

Figure 5A:
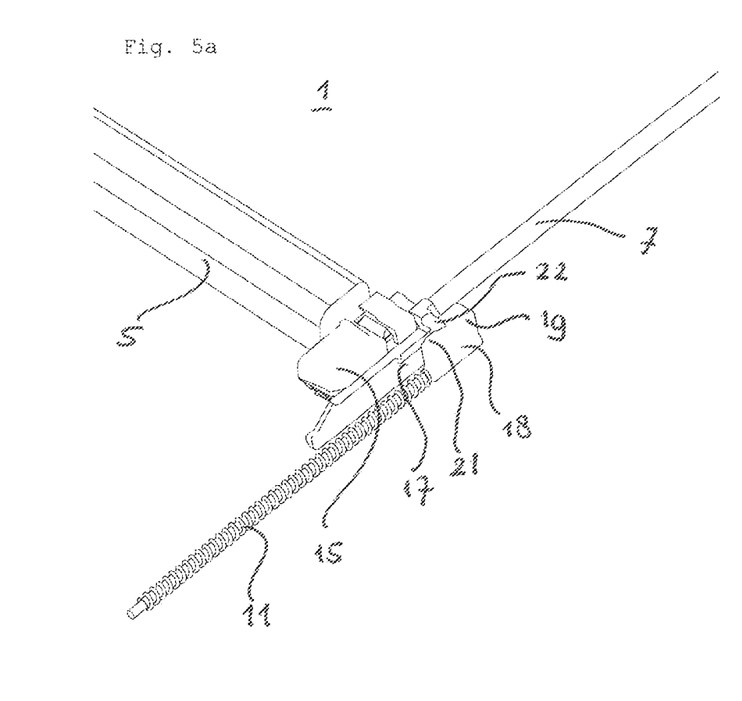
FIGS. 5a and 5b are views corresponding to that of FIGS. 4a and 4b, but showing detail V in FIG. 1.
Figure 5B:
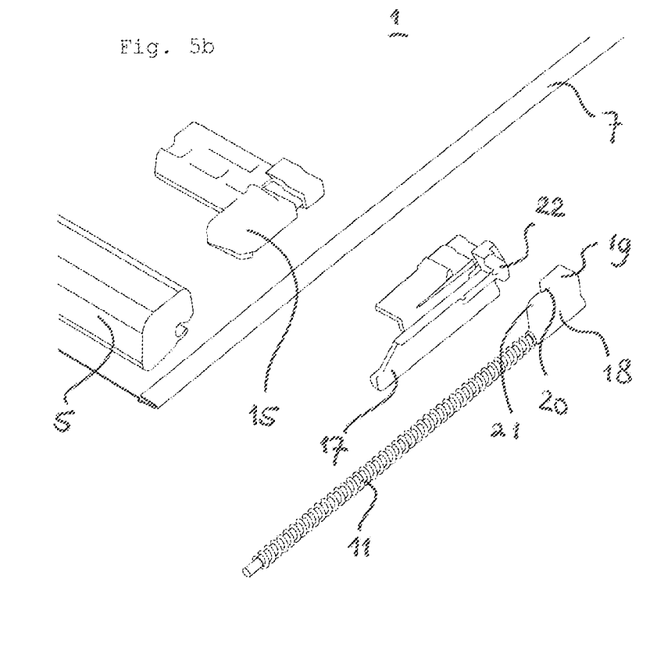

FIG. 5a, 5b show the detachable coupling between cable 11 and operating beam 5 of sunshade 1. There is a slider 15 at the end of operating beam 5 into which a counter member 17 can be fixedly fitted. Slider 15 is guided by slider track 9a between a first and second track end (see FIGS. 3a-3c). Fixed to cable 11 is a coupling member 18, for example by molding it on the end portion of cable 11, although it would also be possible that coupling member 18 is connected to cable 11 such that it is rotatable around the longitudinal axis of cable 11. Coupling member 18 is provided with a lateral protrusion 19 on its end away from cable 11. Next to protrusion 19 is a lateral recess 20 and then a lateral bulge 21. Counter member 17 comprises a nose 22 that fits in recess 20 between protrusion 19 and bulge 21. If coupling member 18 is within guide 9, it is prevented from rotating around the axis of cable 11 and in that position nose 22 is locked in recess 20 between protrusion 19 and bulge 21 on coupling member 18.

Figures 6A, 6B:
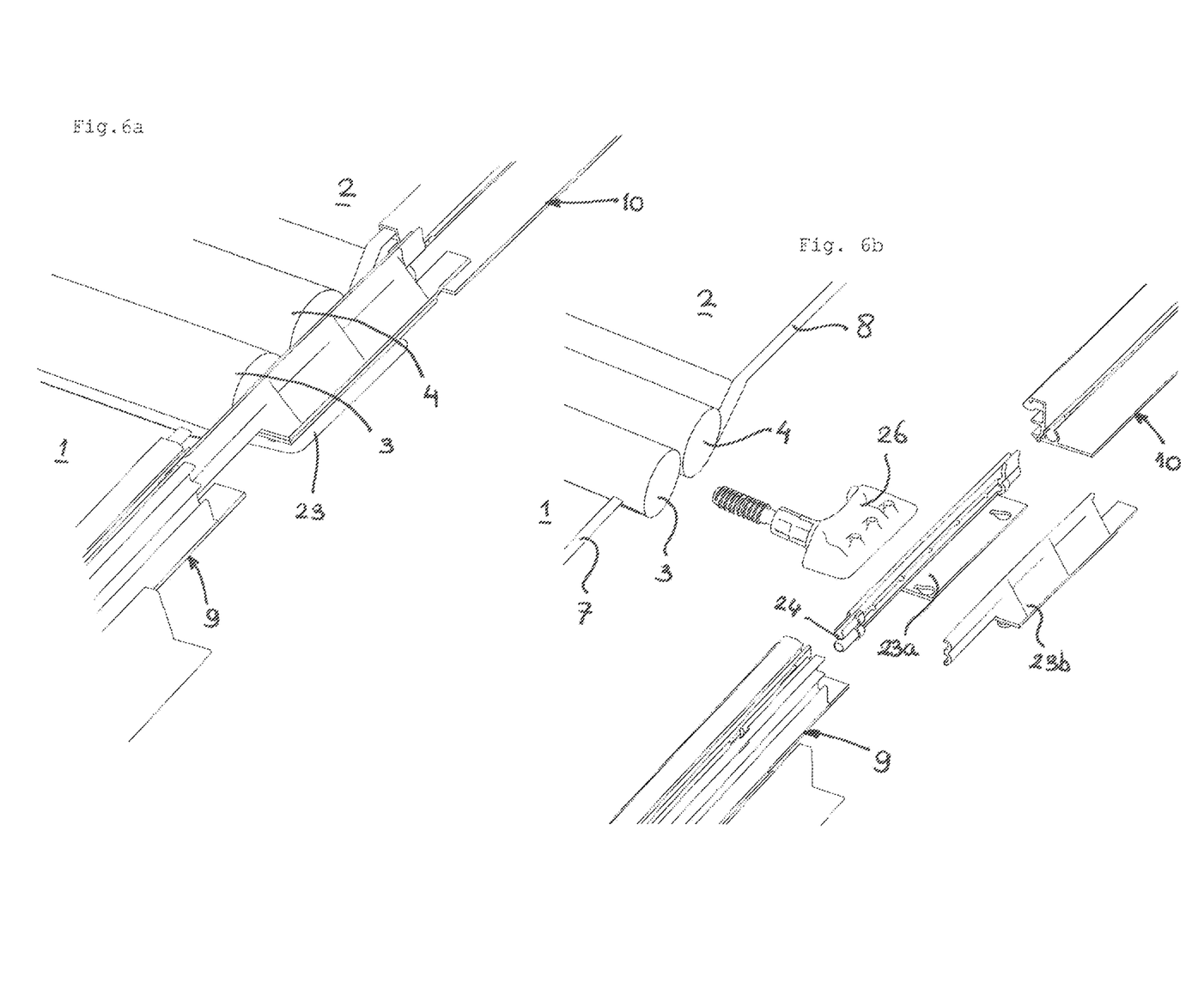
FIGS. 6a and 6b are views corresponding to that of FIGS. 4a and 4b, but showing detail VI in FIG. 1.

FIGS. 6a and 6b show a drive member guide or connecting guide 23 between first or front guide 9 and second or rear guide 10. It comprises in this case two parts 23a, 23b fitted together (further explained later on), together defining a first guide duct 24 for guiding the end of first cable 11 coming out of first guide 9, and a second guide duct 25 for guiding second cable 12 from first guide 9 to second guide 10. It might be supported by a bearing console 26 for the winding rollers 3, 4.

FIG. 6b partly shows that first guide duct 24 is open on the upper side through a control slit 27.

Figure 7A:
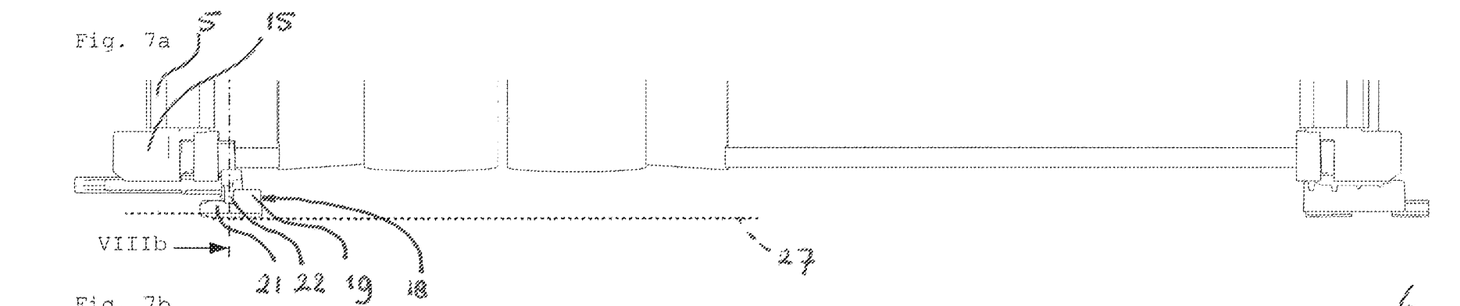
FIGS. 7a, 7b and 7c are views substantially similar to that of FIGS. 3a, 3b and 3c, showing a central part of the drive system without guide rail and on a larger scale.
Figure 7B:
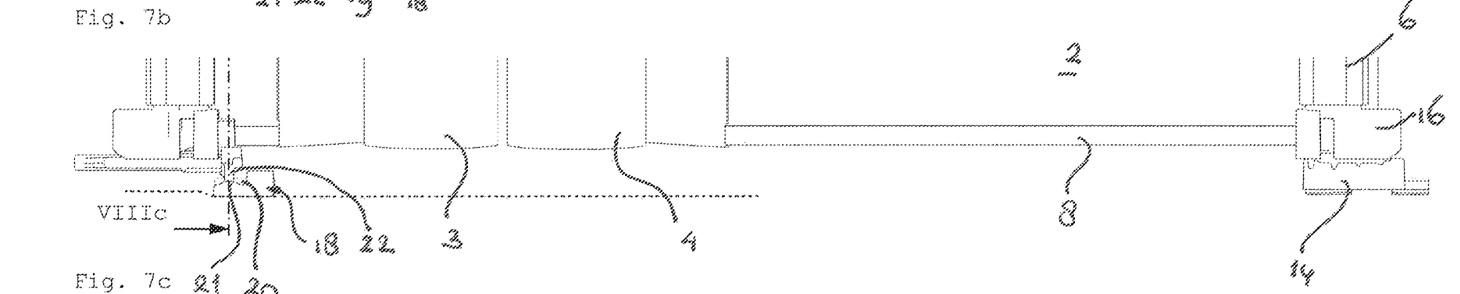
Figure 7C:
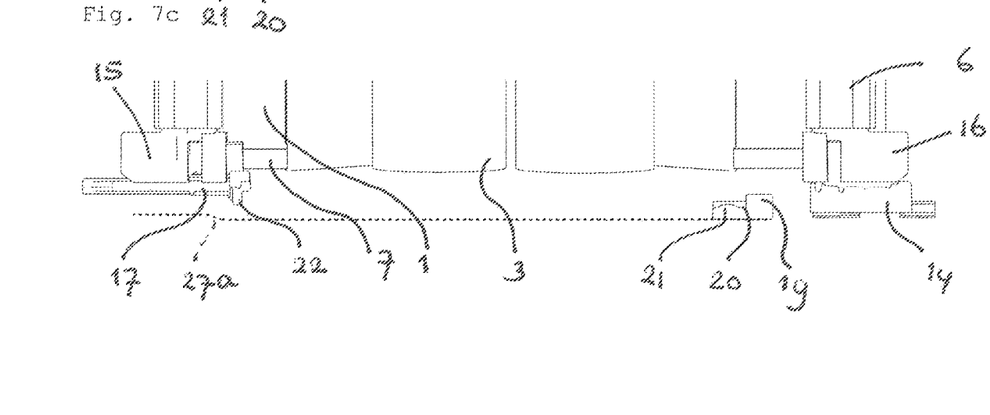

FIGS. 7a-7c show through a dash line 27 the curve of this control slit. Coupling member 18 exits through this control slit 27 to connect cable 11 (not shown) and counter member 17 of operating beam 5 of first rollo 1. Control slit 27 comprises a side step 27a at the position where coupling member 18 must be uncoupled/coupled from/to counter member 17. This side step 27a causes upper part of coupling member 18 to move in lateral direction, and because coupling member 18 is attached to cable 11, coupling member 18 will rotate around the longitudinal axis of cable 11. Due to this rotation coupling member 18 will move away/to counter member 17 such that nose 22 of counter member 17 will move out of/into recess 20 of coupling member and thereby effectively uncouple/couple cable 11 from operating beam 5 of sunshade 1.

FIG. 7a shows that nose 22 is in engagement with recess 20 between protrusion 19 and bulge 21. In FIG. 7b, coupling member 18 is rotated away from counter member 17 due to step 27a in control slit 27 and thus nose 22 is moved away from recess 20 to such extent that bulge 21 can pass nose 22 so that cable 11 is able to move on without taking operating beam 5 along. In the meantime, cable 12 will move operating beam 6 of second sunshade 2 to the fully open position.

FIGS. 8a-8c show the rotation of coupling member 18 in more detail and correspond with FIGS. 7a-7c regarding the position of coupling member 18. In FIG. 8a, coupling member 18 is within first guide 9 in which coupling member 18 is locked against rotation. In FIG. 8b, coupling member 18 has arrived in connecting guide 23 and one wall of control slit 27 has already made way for a rotation. In FIG. 8c, the opposite wall of control slit 27 forces coupling member 18 to rotate in order to allow nose 22 of counter member 17 to leave recess 20 and allow bulge 21 to pass and thus to disengage from coupling member 18.

FIG. 9 shows how one end portion 24a of first guide duct 24 of connecting guide 23 and the opposite end portions 25a. 25b of second guide duct 25 of connecting guide 23 are inserted into first and second guides 9, 10. End parts 28' of cable channels 28 in first guide 9 and end part 29' of cable channel 29 in second guide 10 are widened to receive the end portions 24a, 25a. 25b as shown of guide ducts 24, 25 and offer a substantially smooth guiding of cables 11, 12 (not shown here) at the transition between guides 9, 23, 10. For the sake of clarity it is noted that guides 9, 10 are substantially aligned, but have a slight curvature to be adapted to the curvature of the fixed roof of the vehicle. Such curvature may also be present in connecting guide 23.

Figures 10A, 10B, 10C, 10D:
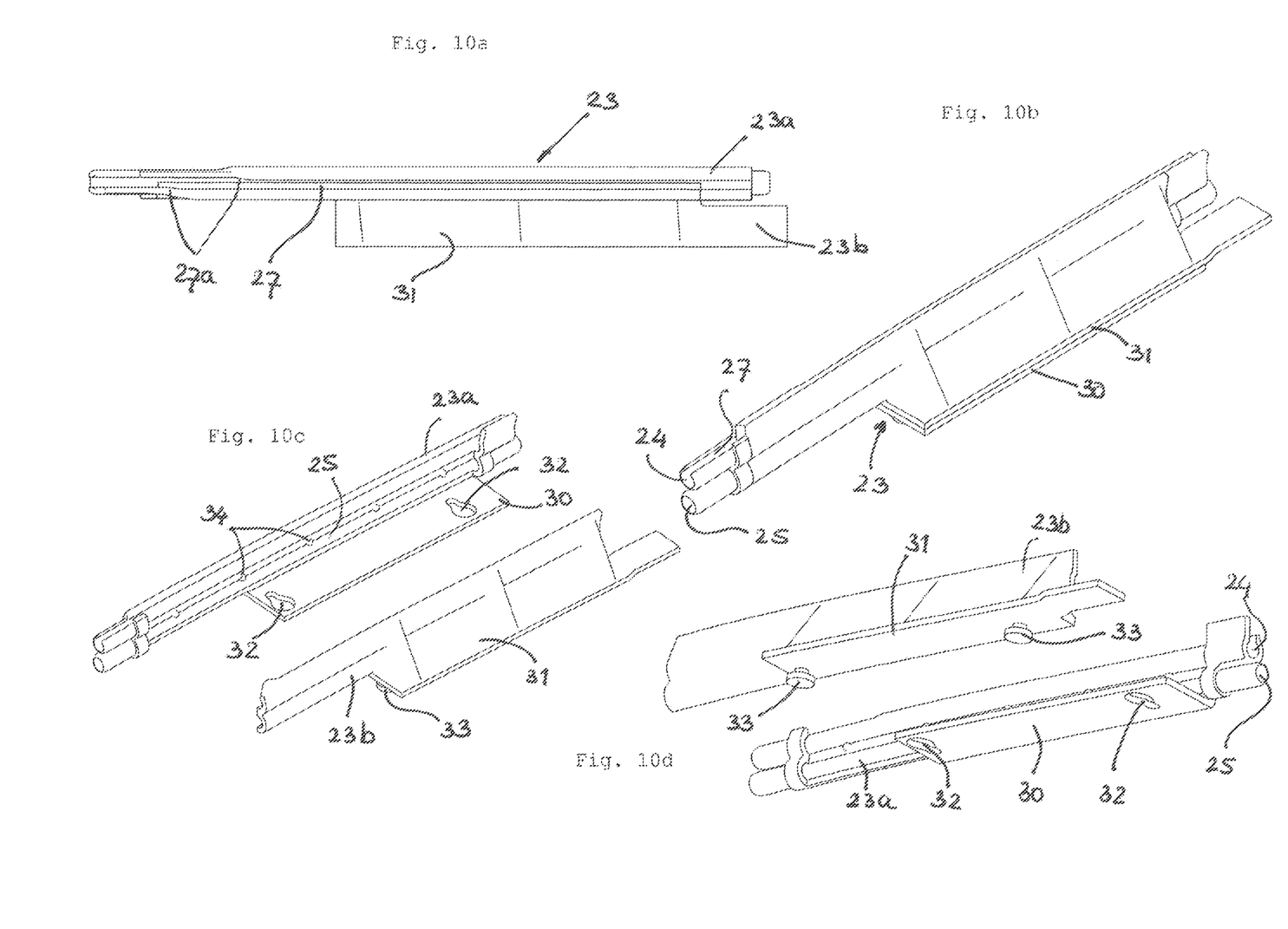
FIGS. 10a, 10b, 10c and 10d are a plan view, a perspective view and exploded views from above and below showing a connecting guide between the first and second guides of the sunshade assembly.

FIG. 10 clearly show parts 23a, 23b of connecting guide 23 and how they are connected. FIGS. 10a, 10b show connecting guide 23 in assembled condition, while FIGS. 10c and 10d are exploded views with parts 23a and 23b separated. The parts 23a, 23b in this embodiment are made from plastic by injection molding. They each have a platform 30, 31, such that platform 31 of part 23b fits onto platform 30 of part 23a. Platform 30 comprises two keyhole-shaped openings 32, and on the lower side of platform 31 there are formed two equally spaced mushroom-shaped knobs 33, such that the head of knobs 33 can be inserted through the larger part of openings 32 and parts 23a and 23b can then be shifted towards each other such that the second guide duct 25 is closed and then the stems of knobs 33 are within the smaller part of openings 32 and the heads of knobs 33 lock parts 23a and 23b against vertical movement. Small pins 34 may be provided on part 23a to securely fit into openings (not shown) in part 23b to further fix parts 23a and 23b together. Parts 23a and 23b may have further means in order to further fix connecting guide 23 to first and second guides 9, 10, for example springy protrusions fitting in holes in the guides.

Figure 11:
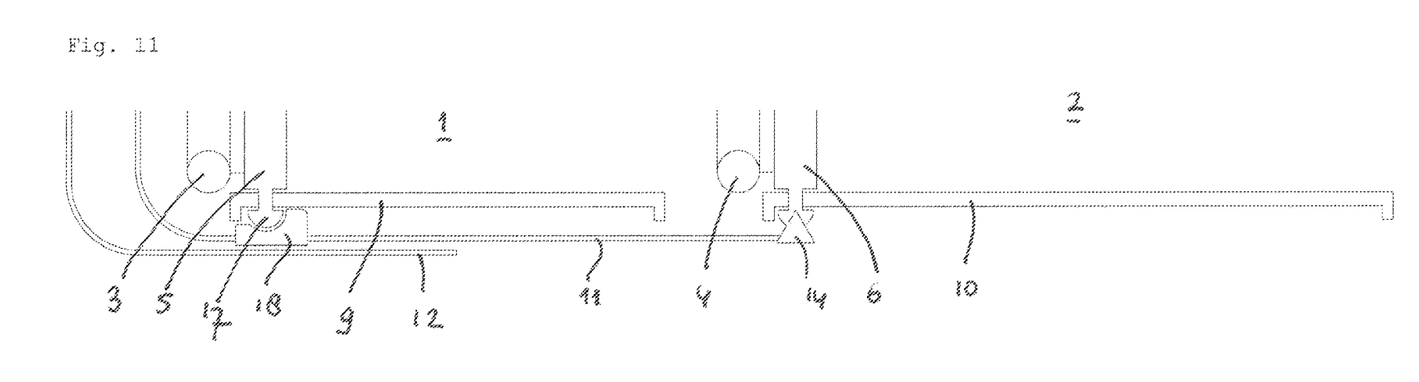
FIGS. 11 and 12 are very schematic plan views of alternative drive systems for the sunshade assembly.
Figure 12:
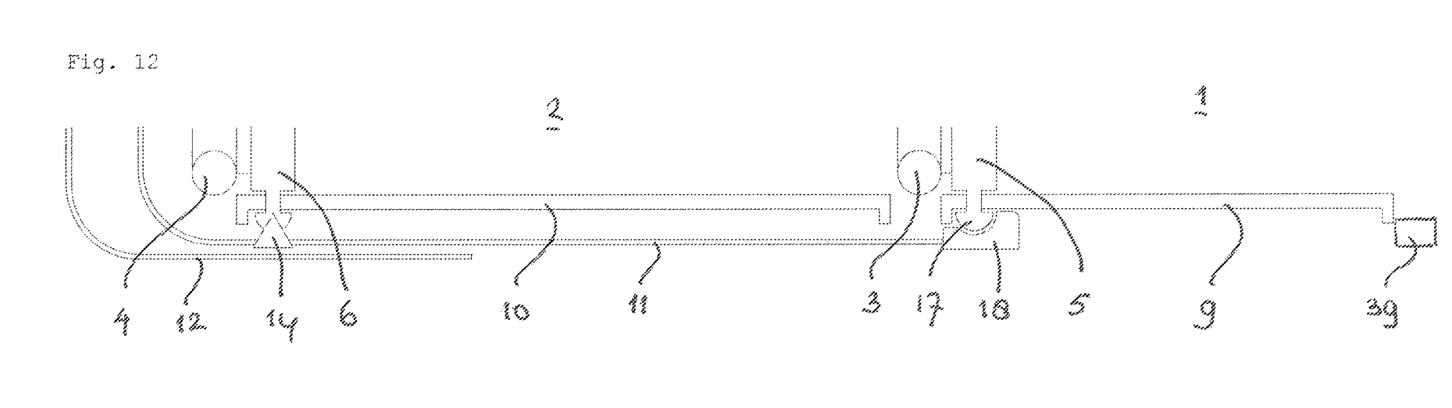

FIGS. 11 and 12 show in a very schematic way two further embodiments of the sunshade assembly. An important difference is that in these embodiments the sunshades move in the same direction, not in opposite directions. This means that on one side edge of the sunshades 1, 2 both operating beams are driven by the same cable, on the edge as shown by cable 11.

In the embodiment of FIG. 11, front sunshade 1 has a shorter unwinding length, like in FIGS. 1-10. This means that the end of cable 11 is permanently coupled to operating beam 6 of sunshade 2. Coupling member 18 for sunshade 1 is now attached at a distance from the end of cable 11 in order to be coupled and uncoupled from counter member 17 on operating beam 5 of sunshade 1. Uncoupling now takes place when sunshade 1 is fully closed (unwound), and sunshade 2 should be further unwound. Control of coupling member 18 can take place in the same way as in the former embodiment, i.e. by means of a connecting guide having a control slit. However, this connecting guide now only needs one guide duct, only for cable 11 which extends through the connecting guide from first guide 9 to second guide 10. The slider for the operating beam 5 should be self-braking to remain in position when cable 11 is uncoupled, or some other brake or lock should be provided to hold sunshade 1 in position.

The embodiment of FIG. 12 differs in that the longer second sunshade 2 is now arranged as front sunshade. Thus fixed coupling member 14 is now attached a distance from the end of cable 11 and coupling member 18 is attached to end of cable 11. Control of coupling member 18 must take place at the rear end of first guide 9 where a drive member guide 39 with control slit is attached to first guide 9. Thus, drive member guide 39 is positioned at the end of first guide 9 like connecting guide 23. A connecting guide might not be necessary in this embodiment and guides 9 and 10 could be integrated into one guide.

From the foregoing it has become clear that the invention provides a simple yet effective assembly for operating two different sunshade members with a single electric motor. One sunshade member may be further operated while the other remains in an end position due to a simple yet reliable coupling member.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in expectedly any appropriately detailed structure. In particular, features presented and described in separate dependent claims may be applied in combination and any advantageous combination of such claims are herewith disclosed.

Further, the terms and phrases used herein are not intended to be limiting, but rather to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e. open language). The term coupled, as used herein, is defined as connected, although not necessarily directly.

The invention being thus described it is apparent that the same may be varied in many ways. Such variations are not to be regarded as a departure from the spirit and scope of the invention, and all such modifications as would be apparent to one skilled in the art are intended to be included within the scope of the following claims.

What is claimed is:

1. A sunshade assembly for a vehicle having at least one roof opening in a fixed roof, the sunshade assembly comprising:
    at least a first and second moveably arranged sunshades positioned one behind the other and each provided for covering a passage opening below the at least one roof opening; and
    a drive assembly configured to move the first and second sunshades, the drive assembly comprising:
        a first guide defining a first slider track extending between a first track end of the first slider track and a second track end of the first slider track;
        an elongated first drive member operatively guided by a guide channel of the first guide;
        a first slider arranged to be coupled to the elongated first drive member through a first coupling and connected to the first sunshade;
        a second guide defining a second slider track extending between a first track end of the second slider track and a second track end of the second slider track, the first guide being substantially aligned with the second guide;
        an elongated second drive member operatively guided by a guide channel in the second guide;
        a second slider attached to the elongated second drive member and connected to the second sunshade;
        a drive motor operatively coupled to the elongated first drive member and configured to move the first slider along the first slider track between the first and second track ends of the first slider track and guided by the guide channel of the first guide in order to move the first sunshade, and operatively coupled to the elongated second drive member and configured to move the second slider along the second slider track between the first and second track ends of the second slider track and guided by the guide channel of the second guide in order to move the second sunshade;
        a connecting guide connecting the first and second guides to guide at least one of the elongated first and elongated second drive members between the first and second guides,
        wherein the second slider track is longer than the first slider track, and wherein the first coupling between the elongated first drive member and the first slider can be uncoupled to drive the second slider while not driving the first slider, and wherein the first coupling includes a coupling member connected to the elongated first drive member to couple and uncouple the coupling member from a counter member on the first slider by a movement of the coupling member, and wherein the connecting guide is shaped to cause the movement of the coupling member when the elongated first and elongated second drive members move in order to open or close the first and second sunshades.

2. The sunshade assembly of claim 1, wherein the coupling member is rotatable around an axis substantially parallel to the first slider track, and wherein the connecting guide is shaped to cause the rotation of the coupling member.

3. The sunshade assembly of claim 2, wherein the coupling member is fixed to the elongated first drive member which is able to be twisted around a longitudinal axis of the elongated first drive member.

4. The sunshade assembly of claim 2, wherein the connecting guide comprises a longitudinal first guide duct to guide the elongated first drive member, the first guide duct being open through a control slit to allow the coupling member to extend between the elongated first drive member and the counter member, the control slit being curved along a length of the first guide duct to cause the rotation of the coupling member.

5. The sunshade assembly of claim 1, wherein the coupling member and the counter member include fitting protrusions locking the coupling member and counter member in a longitudinal direction.

6. The sunshade assembly of claim 4, wherein the connecting guide comprises at least two parts which together define the first guide duct and the control slit for the coupling member.

7. The sunshade assembly of claim 6, wherein the parts of the connecting guide are provided with positioning and fixing members to fit and fix the two parts in a correct position.

8. The sunshade assembly of claim 1, wherein the connecting guide is provided with end portions fitting into end parts of the first and second guides.

9. The sunshade assembly of claim 1, wherein the first and second sunshades are arranged to move in opposite directions, and wherein the elongated first drive member and the elongated second drive member are configured to move with equal speed in opposite directions.

10. The sunshade assembly of claim 9, wherein the elongated first and elongated second drive members are separate elements configured parallel to each other and moving in opposite directions.

11. The sunshade assembly of claim 1, wherein the first and second sunshades are arranged to move in equal directions, and wherein the elongated first drive member and the elongated second drive member are configured to move with equal speed in the same direction.

12. The sunshade assembly of claim 11, wherein the elongated first and elongated second drive members are arranged in series.

13. A roof assembly for a vehicle having a roof opening in a fixed roof, the roof assembly comprising:
at least one closure member configured to close and at least partly opening the roof opening;
a sunshade assembly, comprising at least a first and second moveably arranged sunshades positioned one behind the other and each provided for covering a passage opening below the roof opening; and
a drive assembly configured to move the first and second sunshades, the drive assembly comprising:
a first guide defining a first slider track extending between a first track end of the first slider track and a second track end of the first slider track;
an elongated first drive member operatively guided by a guide channel of the first guide;
a first slider arranged to be coupled to the elongated first drive member through a first coupling and connected to the first sunshade;
a second guide defining a second slider track extending between a first track end of the second slider track and a second track end of the second slider track, the first guide being substantially aligned with the second guide;
an elongated second drive member operatively guided by a guide channel in the second guide;
a second slider attached to the elongated second drive member and connected to the second sunshade;
a drive motor operatively coupled to the elongated first drive member and configured to move the first slider along the first slider track between the first and second track ends of the first slider track and guided by the guide channel of the first guide in order to move the first sunshade, and operatively coupled to the elongated second drive member and configured to move the second slider along the second slider track between the first and second track ends of the second slider track and guided by the guide channel of the second guide in order to move the second sunshade;
a connecting guide connecting the first and second guides to guide at least one of the elongated first and elongated second drive members between the first and second guides,
wherein the second slider track is longer than the first slider track, and wherein the first coupling between the elongated first drive member and the first slider can be uncoupled to drive the second slider while not driving the first slider, and wherein the first coupling includes a coupling member connected to the elongated first drive member to couple and uncouple the coupling member from a counter member on the first slider by a movement of the coupling member, and wherein the connecting guide is shaped to cause the movement of the coupling member when the elongated first and elongated second drive members move in order to open or close the first and second sunshades.

14. The roof assembly of claim 13, wherein the coupling member is rotatable around an axis substantially parallel to the first slider track, and wherein the connecting guide is shaped to cause the rotation of the coupling member.

15. The roof assembly of claim 14, wherein the coupling member is fixed to the elongated first drive member which is able to be twisted around a longitudinal axis of the elongated first drive member.

16. The roof assembly of claim 15, wherein the connecting guide comprises a longitudinal first guide duct to guide the elongated first drive member, the first guide duct being open through a control slit to allow the coupling member to extend between the elongated first drive member and the counter member, the control slit being curved along a length of the first guide duct to cause the rotation of the coupling member.

17. The roof assembly of claim 16, wherein the coupling member and the counter member include fitting protrusions locking the coupling member and counter member in a longitudinal direction.

18. The roof assembly of claim 13, wherein a portion of the coupling member couples to the counter member to transmit driving forces from the elongated first drive member to the first slider to drive the first slider in opposite directions along the first slider track.

19. The sunshade assembly of claim 1, wherein a portion of the coupling member couples to the counter member to transmit driving forces from the elongated first drive member to the first slider to drive the first slider in opposite directions along the first slider track.

20. The sunshade assembly of claim 19, wherein the portion of the coupling member comprises a recess configured to receive a portion of the counter member.

* * * * *